Patented June 25, 1940

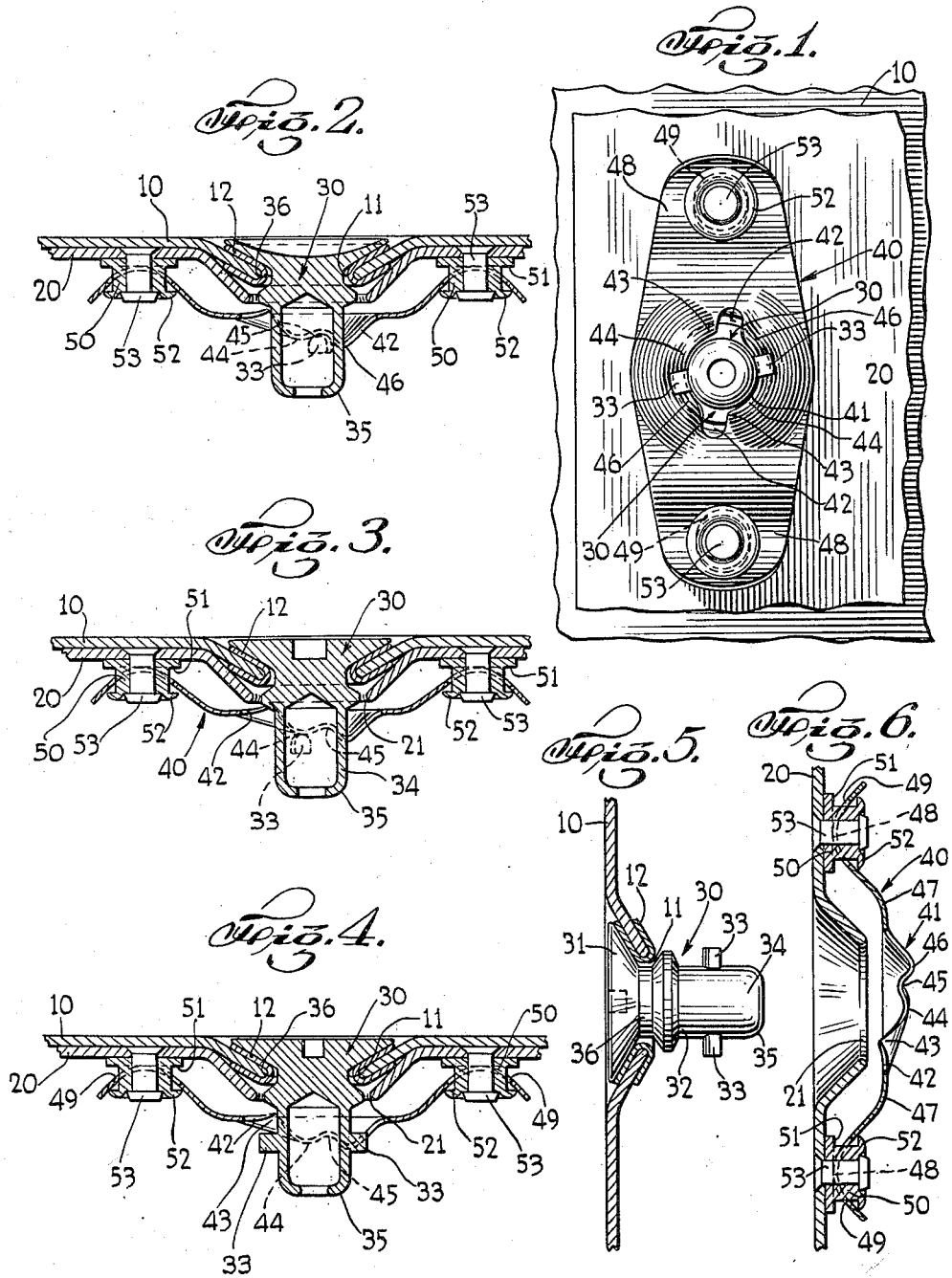

2,205,863

UNITED STATES PATENT OFFICE 2,205,863

COWL FASTENER

Louis J. Rauch and Philip Rauch, Brooklyn, N. Y.

Application June 16, 1939, Serial No. 279,426

8 Claims. (Cl. 24—221)

This invention relates to new and improved fasteners for airplane cowling or the like. The present application is a continuation-in-part of our copending application, Serial No. 267,725, filed April 13, 1939.

Numerous types and constructions of fasteners are known which embody mating fastening elements attached to two parts to be fastened together and means for resiliently but releasably holding the parts in fastened relation. Some of the known fasteners may be used satisfactorily as cowl fasteners, but in all cases of which we are aware the known fasteners possess one or more undesirable characteristics. Although the problem of fastening a cowl sheet to an airplane body structure may seem to be a simple one, in practice there are many special factors in this field of work which impose exacting requirements on the type of fastener to be employed. It is difficult to provide fasteners of the requisite strength, safety and serviceability which also may be manufactured, installed and used easily and economically. Thus, one type of fastener may meet all safety and service requirements but be hard to assemble properly; another may meet safety, service and assembly requirements but involve excessive manufacturing costs; another may cause troubles in service due to difficulties in engaging or disengaging the fastening elements, or to lack of resistance to transverse strains, or to other causes such as lack of continuous positive engagement between the mating elements or lack of positive means to indicate when the elements are safely interlocked.

The most common type of cowl fastener is one which consists of a slotted female element that is adapted to be swivelled to a cowl sheet and a cooperating male element in the form of a wire that is riveted or otherwise fixed to a wall of the airplane so as to extend across an opening in the wall in position to be embraced by and held within the slot of the female element upon turning of the latter. The wire element is formed with coils at its ends which provide the necessary resiliency and by which it is anchored in place.

This known type of fastener may be made to provide the necessary strength in service, but it is comparatively expensive to manufacture. Also, when assembling the fastener for use, difficulties are sometimes encountered in obtaining proper location of the wire member for alignment with the cooperating slotted member, since the act of riveting the wire member in place often causes distortion thereof and dislocation of its locking portion. Moreover, when using a series of these fasteners for releasably fastening a cowl sheet, lack of registration of the several slots with the several cooperating wire members causes trouble in bringing the sheet into a position such that all of the fasteners will be operable, and it is often necessary to determine which of the elements are not in proper registration and to turn them for such registration before the sheet will move into its fastening position. Troubles of this sort are particularly evident when the cowl sheet is slightly bent or bowed.

In the present state of the art a need still exists for a cowl fastener embodying an optimum combination of strength, safety, serviceability, simplicity of manufacture, assembly and use, and low cost to the user, and it is the principal object of our invention to provide such a fastener.

Another object of our invention is to provide a cowl fastener comprising two cooperating fastening elements, one of which is a resilient element that may be readily attached to one of the parts of the airplane, by rivets or the like, with assurance of proper registration with the other element and without danger of troublesome distortion or dislocation thereof during the attachment.

Another object of our invention is to provide a cowl fastener comprising a resilient fastening element which is held in a suitable working position by its attaching means when not under stress but floats or moves relative to its attaching means when under stress, thus freeing the attaching means from direct strains in the use of the fastener.

Further objects of the invention are to provide fasteners including disengageable male and female fastening elements which are constructed so as definitely to be in operable positions when a part bearing a series of the male elements is placed in fastening relation to another part bearing a series of the cooperating female elements; to provide such fasteners in the use of which turning of some of the elements to obtain operable registration thereof may be unnecessary; also, to provide such fasteners which are constructed so as to preclude improper catching or locking of the fastening elements during disengagement thereof and separation of the parts.

A still further object is to provide such fasteners which possess strength and durability more than sufficient to withstand many thousands of engagements, which can be manufactured readily, at a comparatively low cost, without encountering exacting tolerance requirements, and which have a simple and compact construction, of light weight, and a minimum number of parts, all of the parts becoming permanently secured parts of a plane when assembled thereon for use.

The fasteners disclosed in the present application comprise cooperating fastening elements which are attached to two parts to be fastened together so that the bringing together of the two parts and the subsequent actuation of one of the elements results in releasably and resiliently fastening the parts together under tension. One of the elements may be a male element in the form of a pin which is swivelled or otherwise secured to one of the parts, say the cowling of an airplane, for turning movement. This pin carries integral locking means, such as radially extending arms, for interlocking engagement with a resilient female fastening element that is attached to the other part, such as a wall of an airplane to which the cowling is to be fastened. The female fastening element may be formed of strip metal which is flexible under tension, and it may include a central opening and rigid cam and groove means adjacent the opening for cooperation with the locking means on the pin. In this connection, we prefer to use constructions and arrangements such as disclosed and claimed in our aforesaid copending application.

According to the invention of the present application, the female fastening element is constructed and mounted in place in a novel manner which improves the operation of the fastener, simplifies its assembly for use, and increases its durability in service. While practical cowl fasteners of known construction have utilized permanently fixed attachments of both fastening elements to the parts to be fastened and have obtained the necessary amount of flexibility by special formation of one of the elements adjacent rigid points of attachment, such fasteners do not provide the requisite strength and durability in service unless made according to exacting and comparatively expensive specification, and when made satisfactorily they are difficult to assemble for use without causing troublesome distortion or misalignment of the flexible element.

The new fasteners herein disclosed depart further from the prior art and provide the desired strength and assurance of convenient operation, together with the desired amount of flexibility, through a more simple formation of one of the fastening elements and a novel mounting thereof on its respective part. Thus, the resilient or flexible element of the new fasteners, instead of being coiled at its ends to permit the necessary flexion under tension and rigidly attached to its respective part at its ends, is formed with strip metal portions which provide the desired flexibility intermediate its end portions, and the end portions of the flexible element are not attached rigidly in place but, instead, are free to move in a limited path relative to the part on which the element is mounted.

As a further feature of this new construction, the end portions of the flexible element are attached to one of the parts so as to hold the element in a fastening position when not under stress, thereby assuring proper registration with the cooperating male element, and at the same time so as to permit movement of the end portions independent of their attaching means when the element is placed under stress. In this way a sort of lost motion arrangement is provided which frees the operation of the fastener from direct strains on the attaching means for the resilient element while retaining the desired definite location of this element with respect to the cooperating male element. A further resulting advantage is that the assembly and attachment of the resilient element onto its part can be carried out readily and without danger of distortion or misalignment thereof.

A preferred manner of practicing the invention may be fully understood by reference to the following detailed description of one embodiment thereof, when considered in connection with the accompanying drawing, in which Figure 1 is a plan view of the fastener with the elements interlocked.

Figure 2 is a longitudinal section taken approximately along the lines 2—2 of Figure 1.

Figure 3 is a sectional view similar to Figure 2, showing the elements in a position which they assume during the engagement or disengagement thereof.

Figure 4 is a sectional view similar to Figure 2, showing the elements in the position they assume when disengaged.

Figure 5 is a side elevation, partly in section, showing the male fastening element as mounted on its respective part, and Figure 6 is a sectional elevation showing the female fastening element as mounted on its respective part.

Referring to the drawing for illustrative details of a preferred embodiment of the invention, the structure at 10 constitutes a part of the cowling, or one part to be fastened, and the structure at 20 is part of the airplane wall, or a second part to which the first part is to be fastened. The fastener comprises a male element 30 secured, for example, to the first part 10 and a female element 40 secured to the second part 20. In assembly, the male element is permanently secured to part 10 in a manner permitting turning movement, while element 40 is attached to part 20 in a manner holding it in a fixed position thereon when not under stress but permitting movement thereof with respect to part 20 when the fastener is under stress.

As illustrated in Figure 5, the male element 30 is constructed in the form of a pin having a head 31 lying on the outer side of part 10, preferably substantially flush with the surface of said part, a shank 32 extending through and beyond an aperture 11 in part 10, locking means in the form of oppositely disposed radial arms 33 projecting from the pin, and an extended end portion 34 on the shank of the pin beyond the locking arms. The pin 30 includes an annular groove 36 adjacent the head 31, and this groove is embraced by a grommet 12 defining the margins of opening 11. As seen in Figures 2, 3 and 4, the shank of the pin is preferably bored hollow, the arms 33 are integral with the shank, and the end of end portion 34 is turned inwardly to provide a rounded end 35.

The female fastening element 40 comprises a strip of resilient metal providing a central aperture 41 in registration with an aperture 21 in part 20, which in turn registers with aperture 11. The metal bordering aperture 41 is formed to provide oppositely disposed entrances 42 for the arms 33 on pin 30. Adjacent a side of each entrance is a radially extending cam lip 43 which lies in the path of turning movement of an arm 33 when parts 10 and 20 have been moved to a position to be fastened together. The cams 43 extend into humps 44, and beyond each hump the metal adjacent the aperture 41 dips into a groove 45 that is adapted to receive one of the arms 33 on pin 30. Beyond at least one of these grooves a stop or ledge 46 is formed integrally with the metal of the element 40 so as to lie in the path of an arm 33 and positively to prevent turning of pin 30 beyond a predetermined point.

The central portion of element 40; that is, the metal adjacent aperture 41 and forming the structure just described, is preferably hardened and made rigid to cooperate with the locking arms on the pin 30 by being drawn or deformed from a strip of sheet metal forming the female element. In this way certainty of operation and unlimited durability in use are assured.

The female fastening element, however, must be flexible to provide for the fastening of parts 10 and 20 in a yieldable manner, under stress. Accordingly, the strip metal forming the element 40 includes resilient or flexible portions 47 on opposite sides of the central aperture 41 intermediate the end portions of the strip. These resilient portions are bowed somewhat toward the part carrying pin 30, and beyond them the metal of the strip extends into end portions which provide bearing portions 48 that are adapted to ride or slide in relation to part 20 on a suitable bearing surface.

The end portions of the strip, furthermore, are preferably formed in the shape of a U and are provided with longitudinal slots 49 which extend transversely with respect to the U. A bushing 50 is located within each slot 49 during the manufacture of the female element. Bushing 50 is hollow and includes a flanged base 51 which provides a bearing surface for the bearing portions 48 of the metal strip. Adjacent its other end each bushing comprises a flange 52 which overhangs the sides of slot 49 and, in the illustrated embodiment, is located so that its margins are contacted by the inside walls of the U-shaped end portion when the female fastening element is not under stress. Thus the connections between the bushings and the bearing portions allow limited sliding movement between the latter and their bearing surfaces while preventing substantial movement of the bearing portions away from their bearing surfaces.

The assembly of the resilient element 40 on part 20 is effected simply by placing element 40 on part 20 so that its aperture 41 is in proper registration with the pin 30, and then fastening the bushings 50 securely to part 20 by suitable means such as rivets 53. This results in rigid attachment of the bushings to the part 20, but since the bushings are not integrally connected with element 40 and are independent of the flexible portions of this element, the act of assembling and attaching the same to part 20 has no tendency to distort or dislocate the central portion of the strip which cooperates with pin 30.

When the female fastening element has been attached to part 20, and so long as it is not placed under stress, the inside walls of the U-shaped end portions either firmly embrace or lie closely adjacent to the edges of the flanges 52, and the female element is therefore held in fastenable position relative to part 20 and the cooperating male fastening element 30. The fastener is then ready for use, and engagement of the cooperating fastening elements to fasten the parts together is effected simply by moving parts 10 and 20 together and by turning the pin 30.

When the parts have been moved to a fastening position, the end portion 34 on pin 30 has entered aperture 41 and has guided the pin arms 33 to a location such that they may be interengaged with the female element by simple turning movement. Regardless of the specific orientation of the pin arms with respect to the entrances 42, clockwise turning of the pin causes the arms 33 to engage cam lips 43 and thereafter to ride over humps 44 and into fastened position in grooves 45. This movement of the pin requires flexion of the strip 40 toward part 10, which takes place by reason of the flexibility of the intermediate portions 47 of the strip. In the course of this flexion, the bearing portions 48 slide on bearing surfaces 51, which is allowed by the presence of slots 49 and by the fact that flexion of the strip 40 toward part 10 frees the same from confining contact with the flanges 52 on bushings 50. It will thus be evident that when the metal strip constituting the female fastening element is under stress, its extremities or bearing portions are free to move in a limited path relative and parallel to the part to which the strip is attached.

The relative positions of the parts in three different stages of actuation are illustrated in Figures 2, 3 and 4. As shown in Figure 2, the elements are locked together in a position which they assume when parts 10 and 20 are fastened together. In Figure 3, the elements are shown in the positions which they assume when the female element is under maximum stress, that is, when arms 33 lie at the tops of humps 44. It will be noted that flanges 52 and bushings 50 do not affect the movement of the strip to this position. In Figure 4, the elements are shown in the positions which they assume when unfastened. Here flanges 52 engage the strip on both sides of the U-shaped end portions and the strip is held in a fixed position relative to part 20, against any normal tendency to displace it or to cause it to become free under vibration.

The new type of fastener hereinabove described accomplishes the objects of this invention as set forth in the portions of the specification preceding this detailed description, and it has the distinct advantage of being not only easy to assemble, convenient to operate and durable in use, but also of being quite inexpensive to manufacture as compared with practical cowl fasteners of known construction. The male element 30 may be manufactured by ordinary turning and machining operations, and the female element 40 may be manufactured readily from stamped sheet metal, by drawing the metal and then heat treating and quenching it, after which the bushings 50 are easily inserted and located in slots 49. After being assembled for use, these fasteners withstand more than fifty thousand engagements and disengagements without showing signs of failure.

When a cowl sheet bearing a series of the male elements 30 is moved to fastening position relative to a part bearing a series of the cooperating female elements 40, the rounded end 35 and end portion 34 of each pin enter aperture 41 and guide the pin 30 to a location such that the elements may be interlocked by turning movement of the pin, regardless of the original orientation of arms 33 in relation to entrances 42. Thus difficulties such as heretofore encountered are avoided, and a positive fastening of the parts is assured even where the cowl sheet is somewhat bent or bowed.

Furthermore, when the pin 30 of each fastener has been turned to unfasten the sheet, there is no possibility that the arms 33 will catch or interlock with the edges of opening 21 during removal of the sheet, since the end portions 34 of pins 30 are dimensioned to ensure that arms 33 be withdrawn from openings 21 before end 35 leaves aperture 41.

We understand that modifications of the preferred embodiment described herein may be made without departing from the contribution of the invention as disclosed and claimed in this specification, and we therefore desire that the invention be accorded a scope fully commensurate with its contribution to the art as restricted only by the requirements of the claims.

We claim:

1. In a fastener for cowling or the like, a fastening element comprising a metal strip having a central aperture and rigid cam and groove means adjacent said aperture adapted to receive and interlock with a cooperating rotary fastening element in response to turning movement of the latter, said strip having resilient metal sections beyond said aperture and bearing sections beyond said resilient sections adapted to bear slidably upon supporting structure in a plane spaced from the remainder of the strip, a longitudinal slot in each of said bearing sections, and bushings extending through said slots and adapted to be secured permanently to a part to be fastened.

2. In a fastener for cowling or the like a fastening element comprising a metal strip having a central aperture and rigid cam and groove means adjacent said aperture adapted to receive and interlock with a cooperating rotary fastening element upon turning movement of the latter, said strip having resilient metal sections beyond said aperture and bearing sections beyond said resilient sections adapted to bear slidably upon supporting structure in a plane spaced from the remainder of the strip, a longitudinal slot in each of said bearing sections, and a bushing extending through each slot and adapted to be secured permanently to a part to be fastened, said bushings having integral means providing the aforesaid supporting structure.

3. In a fastener for cowling or the like, a fastening element comprising a metal strip having a central aperture and rigid cam and groove means adjacent said aperture adapted to receive and interlock with a cooperating rotary fastening element upon turning movement of the latter, said strip having resilient metal sections beyond said aperture and U-shaped bearing sections beyond said resilient sections adapted to bear slidably upon supporting structure at the base of each U, a longitudinal slot in each bearing section transverse to the U and a bushing extending through each slot and adapted to be secured permanently to a part to be fastened, said bushings having integral means providing the aforesaid supporting structure and integral flanges overhanging the sides of said slots.

4. In a fastener for cowling or the like, an elongated resilient fastening element adapted to be secured adjacent its extremities to one of the parts to be fastened, said element having a central portion adapted to be interlocked with a cooperating rotary fastening element and resilient portions between said central portion and said extremities, each extremity of said resilient element being formed with a longitudinally elongated opening, and an annular bushing extending through and confined within each opening.

5. In a fastener for cowling or the like, an elongated resilient fastening element adapted to be secured adjacent its extremities to one of the parts to be fastened, said element having a central portion to be interlocked with a cooperating rotary fastening element and resilient portions between said central portion and said extremities, each extremity of said resilient element being formed with a longitudinally elongated opening, an annular bushing extending through and confined within each opening, and a flange on each bushing adapted to contact said resilient element and hold the same in fastenable position on said part.

6. In a fastener for cowling or the like, a fastening element comprising a strip of sheet metal having a central aperture and a rigid central portion including rigid means adjacent said aperture to receive and cooperate with a cooperating rotary fastening element in response to turning movement of the latter, said strip having bowed resilient portions on opposite sides of said central portion and bearing portions beyond said resilient portions adapted to bear slidably upon supporting structure in a plane spaced from said central portion, attaching means adapted to be fixed to a part to be fastened for engaging said strip and keeping the same in fastenable position, and slidable connections between said attaching means and said bearing portions for allowing substantial sliding movement of the latter relative to such structure in said plane, said connections including means preventing any substantial movement of said bearing portions away from said plane and means limiting the extent of sliding movement of said bearing portions in said plane.

7. In a fastener for cowling or the like, a fastening element comprising a strip of sheet metal having a central aperture and a rigid central portion including rigid cam and groove means adjacent said aperture to receive and cooperate with a cooperating rotary fastening element in response to turning movement of the latter, said strip having inwardly bowed resilient portions on opposite sides of said central portion and end portions beyond said resilient portions including bearing portions adapted to bear slidably upon supporting structure in a plane spaced inwardly from said central portion, attaching means carried by said end portions and adapted to be fixed to a part to be fastened for keeping said strip in fastenable position, and slidable connections between said attaching means and said end portions for allowing substantial sliding movement of the latter relative to such structure in said plane, said connections including means for preventing substantial movement of said bearing portions away from said structure and means for limiting the extent of sliding movement of said bearing portions in said plane, said attaching means having the aforesaid supporting structure integral therewith.

8. In a fastener for cowling or the like, a fastening element comprising a metal strip having a central aperture and rigid cam and groove means adjacent said aperture adapted to receive and interlock with a cooperating rotary fastening element upon turning movement of the latter, said strip having resilient metal sections beyond said aperture and U-shaped bearing sections beyond said resilient sections adapted to bear slidably upon supporting structure at the base of each U, a closed longitudinal slot in each bearing section transverse to the U and a bushing extending through each slot and adapted to be secured permanently to a part to be fastened, said bushings having integral means providing the aforesaid supporting structure and means for preventing substantial movement of said bearing sections away from said structure.

LOUIS J. RAUCH.
PHILIP RAUCH.